US012624152B2

(12) United States Patent
Kriley et al.

(10) Patent No.: US 12,624,152 B2
(45) Date of Patent: May 12, 2026

(54) CURABLE COMPOSITIONS

(71) Applicant: PPG Industries Ohio, Inc., Cleveland, OH (US)

(72) Inventors: Joseph P. Kriley, Valencia, PA (US); Marvin M. Pollum, Jr., Pittsburgh, PA (US); Masayuki Nakajima, Wexford, PA (US); David J. Fortman, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 378 days.

(21) Appl. No.: 17/753,976

(22) PCT Filed: Jul. 22, 2020

(86) PCT No.: PCT/US2020/043109

§ 371 (c)(1),
(2) Date: Mar. 21, 2022

(87) PCT Pub. No.: WO2021/061263

PCT Pub. Date: Apr. 1, 2021

(65) Prior Publication Data

US 2022/0372207 A1 Nov. 24, 2022

Related U.S. Application Data

(60) Provisional application No. 62/904,315, filed on Sep. 23, 2019.

(51) Int. Cl.

*C08G 18/58* (2006.01)
*B32B 5/02* (2006.01)

(Continued)

(52) U.S. Cl.

CPC .............. *C08G 18/58* (2013.01); *B32B 5/022* (2013.01); *B32B 5/024* (2013.01); *B32B 5/26* (2013.01);

(Continued)

(58) Field of Classification Search

CPC .... C08G 18/58; C08G 18/10; C08G 18/4854; C08G 18/755; C08G 59/188;

(Continued)

(56) References Cited

U.S. PATENT DOCUMENTS 3,636,133 A 1/1972 Hawkins
3,726,835 A 4/1973 Bertozzi (Continued)

FOREIGN PATENT DOCUMENTS

CN 106905904 A 6/2017
EP 0454471 A2 10/1991

(Continued)

OTHER PUBLICATIONS

International Search Report and Written Opinion received for PCT Application Serial No. PCT/US2020/043109 dated Oct. 19, 2020, 11 pages.

(Continued)

*Primary Examiner* — Jeremy R Pierce

(57) ABSTRACT

The present invention is directed to a curable composition including: an isocyanate-functional prepolymer; an epoxy-containing component present in an amount of at least 10 percent by weight of the composition; and a latent curing agent having an ability to react with at least one of the isocyanate-functional prepolymer and the epoxy-containing component upon exposure to an external energy source. The present invention is also directed to methods of making the compositions, methods of coating a substrate, methods of adhering substrates and coated substrates.

18 Claims, 1 Drawing Sheet

(51) Int. Cl.

| | |
|---|---|
| ***B32B 5/26*** | (2006.01) |
| ***B32B 7/12*** | (2006.01) |
| ***B32B 37/12*** | (2006.01) |
| ***C08G 18/10*** | (2006.01) |
| ***C08G 18/48*** | (2006.01) |
| ***C08G 18/75*** | (2006.01) |
| ***C08G 59/18*** | (2006.01) |
| ***C08G 59/40*** | (2006.01) |
| ***C09D 163/00*** | (2006.01) |
| ***C09D 175/04*** | (2006.01) |
| ***C09J 163/00*** | (2006.01) |
| ***C09J 175/04*** | (2006.01) |
| *B32B 15/00* | (2006.01) |
| *B32B 15/14* | (2006.01) |
| *B32B 17/00* | (2006.01) |
| *B32B 17/06* | (2006.01) |
| *B32B 18/00* | (2006.01) |
| *B32B 21/00* | (2006.01) |
| *B32B 21/10* | (2006.01) |
| *B32B 27/00* | (2006.01) |
| *B32B 27/12* | (2006.01) |

(52) U.S. Cl.

CPC ............ *B32B 7/12* (2013.01); *B32B 37/1207* (2013.01); *C08G 18/10* (2013.01); *C08G 18/4854* (2013.01); *C08G 18/755* (2013.01); *C08G 59/188* (2013.01); *C08G 59/4021* (2013.01); *C09D 163/00* (2013.01); *C09D 175/04* (2013.01); *C09J 163/00* (2013.01); *C09J 175/04* (2013.01); *B32B 15/00* (2013.01); *B32B 15/14* (2013.01); *B32B 17/00* (2013.01); *B32B 17/067* (2013.01); *B32B 18/00* (2013.01); *B32B 21/00* (2013.01); *B32B 21/10* (2013.01); *B32B 27/00* (2013.01); *B32B 27/12* (2013.01); *B32B 2037/1253* (2013.01); *B32B 2255/02* (2013.01); *B32B 2255/26* (2013.01); *B32B 2262/0261* (2013.01); *B32B 2262/101* (2013.01); *B32B 2262/106* (2013.01); *B32B 2264/0214* (2013.01); *B32B 2264/202* (2020.08); *B32B 2311/00* (2013.01); *B32B 2315/02* (2013.01); *B32B 2315/08* (2013.01); *B32B 2315/085* (2013.01); *B32B 2317/16* (2013.01); *B32B 2571/02* (2013.01); *B32B 2605/00* (2013.01)

(58) Field of Classification Search

CPC ............. C08G 59/4021; C09D 163/00; C09D 175/04; C09J 163/00; C09J 175/04; B32B 5/022; B32B 5/024; B32B 5/26; B32B 7/12; B32B 37/1207

See application file for complete search history.

(56) References Cited

U.S. PATENT DOCUMENTS

| | | | | |
|---|---|---|---|---|
| 4,128,531 | A | 12/1978 | Toyoda et al. | |
| 4,793,867 | A | 12/1988 | Charles et al. | |
| 5,468,831 | A | 11/1995 | Lenke et al. | |
| 5,588,989 | A | 12/1996 | Vonk et al. | |
| 5,952,431 | A | 9/1999 | Okada | |
| 6,037,392 | A * | 3/2000 | Tang | C08L 51/04 525/902 |
| 7,749,368 | B2 | 7/2010 | McMurdie et al. | |
| 8,673,091 | B2 | 3/2014 | McMillen et al. | |
| 8,796,361 | B2 | 8/2014 | Asay et al. | |
| 9,562,175 | B2 | 2/2017 | Asay et al. | |
| 2007/0154727 | A1 | 7/2007 | Ziegler et al. | |
| 2009/0288766 | A1* | 11/2009 | Kramer | C08G 18/10 156/275.5 |
| 2010/0151138 | A1* | 6/2010 | Occhiello | C08G 18/10 427/407.1 |
| 2010/0213623 | A1* | 8/2010 | Isshiki | C08L 83/14 257/E23.116 |
| 2012/0120039 | A1 | 5/2012 | Su et al. | |
| 2014/0037966 | A1 | 2/2014 | Renkel et al. | |
| 2015/0030844 | A1 | 1/2015 | Sang et al. | |
| 2015/0045510 | A1 | 2/2015 | Braendli et al. | |
| 2015/0315378 | A1* | 11/2015 | Turakhia | C08G 59/56 252/182.28 |
| 2017/0158908 | A1* | 6/2017 | Doss | C08G 65/33348 |
| 2017/0218114 | A1* | 8/2017 | Kasemi | C08G 59/5033 |
| 2019/0010373 | A1* | 1/2019 | Haag | C08G 59/686 |
| 2019/0100616 | A1* | 4/2019 | Zhou | C08G 59/686 |

FOREIGN PATENT DOCUMENTS

| | | | |
|---|---|---|---|
| EP | 0757067 | A1 | 2/1997 |
| JP | 1999106544 | A | 4/1999 |
| JP | 2001064344 | A | 3/2001 |
| JP | 2002293864 | A | 10/2002 |
| JP | 2007246654 | A | 9/2007 |
| JP | 2008133395 | A | 6/2008 |
| KR | 20080102823 | A | 11/2008 |
| KR | 10-2014-0100463 | A | 8/2014 |
| KR | 10-2014-0140061 | A | 12/2014 |

OTHER PUBLICATIONS

"13th Five-Year" Ordinary High Education Undergarduate Planning Teaching materials, Polymer Modification Principles, Published Mar. 31, 2018 by Wang Wenguang, China Light Industry Press, pp. 91, involving claims 1-45.

* cited by examiner

CURABLE COMPOSITIONS

GOVERNMENT CONTRACT

This invention was made with Government support under Government Contract 13-02-0046 awarded by awarded by TARDEC (Tank and Automotive Research, Development and Engineering Center (US Army)). The United States Government has certain rights in this invention.

FIELD OF THE INVENTION

The present invention relates to curable compositions and to adhesives, sealants, coatings and composites.

BACKGROUND OF THE INVENTION

Curable compositions are utilized in a wide variety of applications such as to treat a variety of substrates, bond together two or more substrate materials, and fabricate composite substrates.

The present invention is directed toward one-component curable compositions that are easy to apply for use in coating, sealing, bonding together substrate materials or forming composites.

SUMMARY OF THE INVENTION

Disclosed herein is a curable composition comprising: an isocyanate-functional prepolymer; an epoxy-containing component present in an amount of at least 10 percent by weight of the composition; and a latent curing agent having an ability to react with at least one of the isocyanate-functional prepolymer and the epoxy-containing component upon exposure to an external energy source.

Also disclosed herein is a substrate comprising a surface at least partially coated with a layer formed from a curable composition comprising: an isocyanate-functional prepolymer; an epoxy-containing component present in an amount of at least 10 percent by weight of the composition; and a latent curing agent having an ability to react with at least one of the isocyanate-functional prepolymer and the epoxy-containing component upon exposure to an external energy source.

Also disclosed is a substrate at least partially embedded in a curable composition comprising: an isocyanate-functional prepolymer; an epoxy-containing component present in an amount of at least 10 percent by weight of the composition; and a latent curing agent having an ability to react with at least one of the isocyanate-functional prepolymer and the epoxy-containing component upon exposure to an external energy source.

Also disclosed is an article of protective clothing comprising a curable composition comprising: an isocyanate-functional prepolymer; an epoxy-containing component present in an amount of at least 10 percent by weight of the composition; and a latent curing agent having an ability to react with at least one of the isocyanate-functional prepolymer and the epoxy-containing component upon exposure to an external energy source.

Also disclosed is an article comprising a first substrate, a second substrate and a curable composition comprising: an isocyanate-functional prepolymer; an epoxy-containing component present in an amount of at least 10 percent by weight of the composition; and a latent curing agent having an ability to react with at least one of the isocyanate-functional prepolymer and the epoxy-containing component upon exposure to an external energy source, wherein the curable composition is positioned between the first substrate and the second substrate in an at least partially cured state as an adhesive to adhere the first substrate to the second substrate.

Also disclosed is a method of treating a substrate comprising: contacting at least a portion of a substrate with a curable composition comprising: an isocyanate-functional prepolymer; an epoxy-containing component present in an amount of at least 10 percent by weight of the composition; and a latent curing agent having an ability to react with at least one of the isocyanate-functional prepolymer and the epoxy-containing component upon exposure to an external energy source; and exposing the curable composition to an external energy source.

Further disclosed herein is a curable composition comprising: an isocyanate-functional prepolymer; an epoxy-containing component present in an amount of at least 10 percent by weight of the composition; and a curing agent, wherein the curable composition has a first uncured state when the curing agent is a solid and will transition from the first uncured state to a second at least partially cured state when the curing agent changes phase from a solid to a liquid or dissolves into the curable composition.

Further disclosed herein is a substrate comprising at least one surface at least partially coated with a layer formed from a curable composition comprising: an isocyanate-functional prepolymer; an epoxy-containing component present in an amount of at least 10 percent by weight of the composition; and a curing agent, wherein the curable composition has a first uncured state when the curing agent is a solid and will transition from the first uncured state to a second at least partially cured state when the curing agent changes phase from a solid to a liquid or dissolves into the curable composition.

Further disclosed is a substrate at least partially embedded in a curable composition comprising: an isocyanate-functional prepolymer; an epoxy-containing component present in an amount of at least 10 percent by weight of the composition; and a curing agent, wherein the curable composition has a first uncured state when the curing agent is a solid and will transition from the first uncured state to a second at least partially cured state when the curing agent changes phase from a solid to a liquid or dissolves into the curable composition.

Further disclosed is an article of protective clothing comprising a curable composition comprising: an isocyanate-functional prepolymer; an epoxy-containing component present in an amount of at least 10 percent by weight of the composition; and a curing agent, wherein the curable composition has a first uncured state when the curing agent is a solid and will transition from the first uncured state to a second at least partially cured state when the curing agent changes phase from a solid to a liquid or dissolves into the curable composition.

Further disclosed is an article comprising a first substrate, a second substrate and a curable composition comprising: an isocyanate-functional prepolymer; an epoxy-containing component present in an amount of at least 10 percent by weight of the composition; and a curing agent, wherein the curable composition has a first uncured state when the curing agent is a solid and will transition from the first uncured state to a second at least partially cured state when the curing agent changes phase from a solid to a liquid or dissolves into the curable composition, wherein the curable composition is positioned between the first substrate and the second substrate in an at least partially cured state as an adhesive to adhere the first substrate to the second substrate.

Further disclosed herein is a method comprising: contacting at least a portion of a substrate with a curable composition comprising: an isocyanate-functional prepolymer; an epoxy-containing component present in an amount of at least 10 percent by weight of the composition; and a curing agent, wherein the curable composition has a first uncured state when the curing agent is a solid and will transition from the first uncured state to a second at least partially cured state when the curing agent changes phase from a solid to a liquid or dissolves into the curable composition; and effecting a change of the curing agent from a solid to a liquid phase.

DETAILED DESCRIPTION OF THE INVENTION

Figure 1:
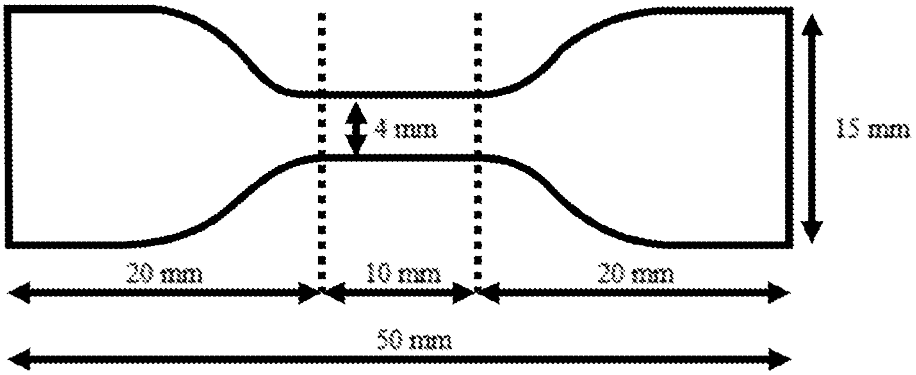
FIG. 1 is a schematic of a tensile specimen for the curable compositions prepared in Examples 1, 2, and 3.

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "an" epoxy-containing component and "a" curing agent, a combination (i.e., a plurality) of these components can be used.

In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, a coating composition "applied onto" a substrate does not preclude the presence of one or more other intervening coating layers of the same or different composition located between the coating composition and the substrate.

As used herein, a "coating composition" refers to a composition, e.g., a solution, mixture or a dispersion that, in an at least a partially dried or cured state, is capable of producing a film, layer or the like on at least a portion of a surface of a substrate.

As used herein, a "sealant composition" refers to a coating composition, e.g., a solution, mixture or dispersion that, in an at least partially dried or cured state, has a property or ability to resist atmospheric conditions and particulate matter, such as moisture and temperature and at least partially block the transmission of materials, such as particulates, water, fuel or other liquids and gases therethrough.

As used herein, the term "structural adhesive" means an adhesive producing a load-bearing joint having a lap shear strength of at least five megapascals (MPa) tested using an INSTRON model 5567 in tensile mode with a pull rate of thirteen millimeters (mm) per minute prepared on one inch wide by four inches long by 0.040 inches thick untreated 6022 Aluminum, with an overlap area of one inch by 0.5 inches.

As defined herein, a "1K" or "one-component" coating composition, is a composition in which all of the ingredients may be premixed and stored and wherein the reactive components do not readily react at ambient or slightly thermal conditions, but instead only react upon activation by an external energy source. In the absence of activation from the external energy source, the composition will remain largely unreacted (maintaining sufficient workability in the uncured state and greater than 50% of the initial lap shear strength of the composition in the cured state after storage at 25° C. in the uncured state for at least one month under a nitrogen blanket). External energy sources that may be used to promote the curing reaction (i.e., the reaction of the epoxy component and/or the polyisocyanate component with the curing agent) include, for example, radiation (i.e., actinic radiation), pressure, and/or heat.

As further defined herein, ambient conditions generally refer to room temperature and humidity conditions or temperature and humidity conditions that are typically found in the area in which a curable composition such as an adhesive composition is being applied to a substrate, e.g., at 10° C. to 40° C. and 5% to 80% relative humidity, while slightly thermal conditions are temperatures that are slightly above ambient temperature but are generally below the curing temperature for the coating composition (i.e. in other words, at temperatures and humidity conditions below which the reactive components will readily react and cure, e.g., greater than 40° C. and less than 100° C. at 5% to 80% relative humidity).

As used herein, "Mw" refers to the weight average molecular weight, for example the theoretical value as determined by Gel Permeation Chromatography using Waters 2695 separation module with a Waters 410 differential refractometer (RI detector) and polystyrene standards, tetrahydrofuran (THF) used as the eluent at a flow rate of 1 ml $min^{-1}$, and two PL Gel Mixed C columns used for separation.

As used herein, the term "accelerator" means a substance that increases the rate or decreases the activation energy of a chemical reaction. An accelerator may be either a "catalyst," that is, without itself undergoing any permanent chemical change, or may be reactive, that is, capable of chemical reactions and includes any level of reaction from partial to complete reaction of a reactant.

As used herein, the terms "latent" or "blocked" or "encapsulated", when used with respect to a curing agent or an accelerator, means a molecule or a compound that is activated by an external energy source prior to reacting (i.e., crosslinking) or having a catalytic effect, as the case may be. For example, an accelerator may be in the form of a solid at room temperature and have no catalytic effect until it is heated and melts or dissolves in the composition, or the latent accelerator may be reversibly reacted with a second compound that prevents any catalytic effect until the reversible reaction is reversed by the application of heat and the second compound is removed, freeing the accelerator to catalyze reactions. In other examples, an accelerator or curing agent may be encapsulated within a shell or capsule preventing any catalytic effect until the shell is ruptured or melts.

As used herein, the term "curing agent" means any reactive material that can be added to a composition to accelerate curing of the composition (e.g., curing of a polymer). The term "reactive" when used with respect to the curing agent means capable of chemical reactions and includes any level of reaction from partial to complete reaction of a reactant.

As used herein, the term "cure", "cured" or similar terms, as used in connection with the composition described herein, means that at least a portion of the components that form the composition are reacted to form a coating, film, layer, or bond. Additionally, curing of the composition refers to subjecting the composition to curing conditions (e.g., elevated temperature, lowered activation energy through catalytic activity, etc.) leading to the reaction of the reactive functional groups of the components of the composition, and resulting in the reaction of the components of the composition and formation of an at least partially cured or gelled coating. As used herein, the term "at least partially cured" with respect to a coating refers to a coating formed by subjecting the composition to curing conditions such that a chemical reaction of at least a portion of the reactive groups of the components of the composition occurs to form a coating, film, layer, or bond. A coating composition may be considered to be "at least partially cured" if it has a lap shear strength of greater than 0.2 megapascal (MPa) measured according to ASTM D1002-10 by using an INSTRON 5567 machine in tensile mode with a pull rate of 1.3 millimeters (mm) per minute. The coating composition may also be subjected to curing conditions such that a substantially complete cure is attained and wherein further subjecting the composition to curing conditions results in no significant further improvement in the coating properties such as, for example, increased lap shear performance.

As used herein, unless indicated otherwise, the term "substantially free" means that a particular material is not purposefully added to a mixture or composition, respectively, and is only present as an impurity in a trace amount of less than five percent by weight based on a total weight of the mixture or composition, respectively. As used herein, unless indicated otherwise, the term "essentially free" means that a particular material is only present in an amount of less than two percent by weight based on a total weight of the mixture or composition, respectively. As used herein, unless indicated otherwise, the term "completely free" means that a mixture or composition, respectively, does not comprise a particular material, i.e., the mixture or composition comprises zero percent by weight of such material.

As used herein, the term "glass transition temperature" ("Tg") refers to the temperature at which an amorphous material, such as glass or a high molecular weight polymer, changes from a brittle vitreous state to a plastic or rubbery state or from a plastic or rubbery state to a brittle vitreous state.

Reference to any monomer(s) herein refers generally to a monomer that can be polymerized with another polymerizable compound such as another monomer or polymer. Unless otherwise indicated, it should be appreciated that once the monomer components react with one another to form the compound, the compound will comprise the residues of the monomer components.

The present invention is directed to curable compositions comprising, consisting essentially of or consisting of: an isocyanate-functional prepolymer; an epoxy-containing component present in an amount of at least 10 percent by weight of the composition; and a latent curing agent having an ability (e.g., a property) to react with at least one of the isocyanate-functional prepolymer and the epoxy-containing component upon exposure to external energy source.

As noted, one component of a curable composition according to the invention is an isocyanate-functional prepolymer. As used herein, the term "isocyanate" includes unblocked isocyanate functional groups capable of forming a covalent bond with a reactive group such as a hydroxyl, thiol, or amine functional group. Thus, isocyanate can refer to "free isocyanate", which will be understood to those skilled in the art.

The isocyanate-functional prepolymer is a reaction product of an isocyanate and a species or molecule having an average of more than one reactive hydrogen such as a polyol, a polyamine, a polythiol, or a mixture or combination of such species or molecules.

Suitable isocyanates typically include monomeric and/or oligomeric isocyanates. For example, the isocyanate can be $C_2$-$C_{20}$ linear, branched, cyclic, aromatic, aliphatic, or combinations thereof.

Suitable isocyanates for use in the present invention may include but are not limited to isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_{12}$MDI, available as DESMODUR® W from Covestro AG of Pittsburgh, PA); mixed aralkyl diisocyanates such as tetramethylxylyl diisocyanates, OCN—C$(CH_3)_2$—$C_6H_4C(CH_3)_2$—NCO; polymethylene isocyanates such as 1,4-tetramethylene diisocyanate, 1,5-pentamethylene diisocyanate, 1,6-hexamethylene diisocyanate (HDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate; and mixtures thereof.

Non-limiting examples of aromatic isocyanates suitable for use in the present invention may include but are not limited to phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate, alkylated benzene diisocyanates, methylene-interrupted aromatic diisocyanates such as methylenediphenyl diisocyanate, 4,4'-isomer (MDI) including alkylated analogs such as 3,3'-dimethyl-4,4'-diphenylmethane diisocyanate, polymeric methylenediphenyl diisocyanate; and mixtures thereof.

In other non-limiting examples of the present invention, the isocyanate can include an oligomeric isocyanate such as but not limited to dimers such as the uretdione of 1,6-hexamethylene diisocyanate, trimers such as the biuret and isocyanurate of 1,6-hexamethylenediisocyanate and the isocyanurate of isophorone diisocyanate, allophonates and polymeric oligomers. Modified isocyanates can also be used, including but not limited to carbodiimides and uretonimines, and mixtures thereof. Suitable materials include, without limitation, those available under the designation DESMODUR® from Covestro AG of Pittsburgh, PA and include DESMODUR® N 3200, DESMODUR® N 3300, DESMODUR® N 3400, DESMODUR® XP 2410 and DESMODUR® XP 2580.

The isocyanate in the isocyanate-functional prepolymer may be present in an excess amount, often greater than 1.1:1, based on equivalents of isocyanate to active hydrogen (e.g., —OH, —NH, —SH) in the isocyanate-functional prepolymer.

To prepare the isocyanate-functional prepolymer of the curable composition of the present invention, an isocyanate may be reacted with a molecule having on average greater than one active hydrogen that are readily reactable with an isocyanate group. Examples include polyols, polyamines, polythiols or a combination of these molecules.

Suitable polyols may include diols, triols, tetraols and higher functional polyols as well as combinations of such polyols. The polyols may be based on a polyether chain derived from ethylene glycol, propylene glycol, butylene glycol, hexylene glycol and the like as well as mixtures thereof. The polyol may also be based on a polyester chain derived from ring opening polymerization of caprolactone (referred to as polycaprolactone-based polyols hereinafter). Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof.

Representative polyols include polyethers having two or more hydroxyl groups. Examples include but are not limited to polyalkylene glycols such as polytetramethylene ether glycol ("PTMEG") commercially available as TERATHANE® from the LYCRA Company, such as TERATHANE® 650 that has a molecular weight of 625-675. Other example TERATHANE® polyols include TERATHANE® 250, TERATHANE® 1000, TERATHANE® 1400, TERATHANE® 1800 and TERATHANE® 2000. Another example of a polyol is a (1,2-propylene ether) glycol. The polyol may comprise a polytetrahydrofuran-based polyol. The polytetrahydrofuran-based polyols may comprise diols, triols or tetraols terminated with primary hydroxyl groups. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

The polyol may comprise a polycaprolactone-based polyol. The polycaprolactone-based polyols may comprise diols, triols or tetraols terminated with primary hydroxyl groups. Commercially available polycaprolactone-based polyols include those sold under the trade name Capa™ from Perstorp Group, such as, for example, Capa 2054, Capa 2077A, Capa 2085, Capa 2205, Capa 3031, Capa 3050, Capa 3091 and Capa 4101.

Representative polyamines comprise compounds comprising at least two primary or secondary amine groups. Useful diamines include, but are not limited to, ethylenediamine, tetramethylenediamine, hexamethylenediamine, 2-methylpentamethylenediamine (available as Dytek A from Invista), isophorone diamine, 4,4-diaminodicyclohexylmethane, diaminocyclohexane, bis(aminomethyl)norbornane, bis(aminomethyl)cyclohexane, piperazine, aminoethylpiperazine, bis(aminopropyl)piperazine, xylylenediamine, methylenedianiline, polyether diamines such as those of the Jeffamine D, ED, or EDR series available from Huntsman. Useful polyamines include, but are not limited, to diethylenetriamine, triethylenetetramine, tetraethylenepentamine, tris(2-aminoethyl)amine, tris(3-aminopropyl)amine, and trifunctional polyether amines such as the Jeffamine T-403, Jeffamine T-3000, and Jeffamine T-5000 available from Huntsman.

Representative polythiols comprise compounds comprising at least two thiol functional groups. The polythiol compound may comprise a dithiol, trithiol, tetrathiol, pentathiol, hexathiol or higher functional polythiol compound. A polythiol compound may comprise a dithiol compound such as 3,6-dioxa-1,8-octanedithiol (DMDO), 3-oxa-1,5-pentanedithiol, 1,2-ethanedithiol, 1,3-propanedithiol, 1,2-propanedithiol, 1,4-butanedithiol, 1,3-butanedithiol, 2,3-butanedithiol, 1,5-pentanedithiol, 1,3-pentanedithiol, 1,6-hexanedithiol, 1,3-dithio-3-methylbutane, ethyl cyclohexyldithiol (ECHDT), methylcyclohexyldithiol, methyl-substituted dimercaptodiethyl sulfide, dimethyl-substituted dimercaptodiethyl sulfide, 2,3-dimercapto-1-propanol, bis-(4-mercaptomethylphenyl) ether, 2,2'-thiodiethanethiol, and glycol dimercaptoacetate (commercially available as THIOCURE® GDMA from BRUNO BOCK Chemische Fabrik GmbH & Co. KG). The polythiol compound may comprise a trithiol compound such as trimethylolpropane trimercaptoacetate (commercially available as THIOCURE® TMPMA from BRUNO BOCK Chemische Fabrik GmbH & Co. KG), trimethylopropane tris-3-mercaptopropionate (commercially available as THIOCURE® TMPMP from BRUNO BOCK Chemische Fabrik GmbH & Co. KG), ethoxylated trimethylpropane tris-3-mercaptopropionate polymer (commercially available as THIOCURE® ETTMP from BRUNO BOCK Chemische Fabrik GmbH & Co. KG), tris[2-(3-mercaptopropionyloxy)ethyl]isocyanurate (commercially available as THIOCURE® TEMPIC from BRUNO BOCK Chemische Fabrik GmbH & Co. KG). The polythiol compound may comprise a tetrathiol compound such as pentaerythritol tetramercaptoacetate (commercially available as THIOCURE® PETMA from BRUNO BOCK Chemische Fabrik GmbH & Co. KG), pentaerythritol tetra-3-mercaptopropionate (commercially available as THIOCURE® PETMP from BRUNO BOCK Chemische Fabrik GmbH & Co. KG), and polycaprolactone tetra(3-mercaptopropionate) (commercially available as THIOCURE® PCL4MP 1350 from BRUNO BOCK Chemische Fabrik GmbH & Co. KG). Higher functional polythiol compounds may include dipentaerythritol hexa-3-mercaptopropionate (commercially available as THIOCURE® DiPETMP from BRUNO BOCK Chemische Fabrik GmbH & Co. KG). Combinations of polythiol molecules or compounds may also be used.

The polythiol molecule or compound may comprise a mercaptan terminated polysulfide. Commercially available mercaptan terminated polysulfides include those sold under the trade name THIOKOL® LP from Toray Fine Chemicals Co., Ltd., including, but not limited to, LP-3, LP-33, LP-23, LP-980, LP-2, LP-32, LP-12, LP-31, LP-55 and LP-56. The THIOKOL LP mercaptan terminated polysulfides have the general structure $HS—(C_2H_4—O—CH_2—O—C_2H_4—S—S)_nC_2H_4—O—CH_2—O—C_2H_4—SH$, wherein n is an integer of 5 to 50. Other commercially available mercaptan terminated polysulfides include those sold under the trade name THIOPLAST® G™ from Akzo Nobel Chemicals International B.V., including, but not limited to, G 10, G 112, G 131, G 1, G 12, G 21, G 22, G 44 and G 4. The THIOPLAST G mercaptan terminated polysulfides are blends of di- and tri-functional mercaptan-functional polysulfides with the di-functional unit having the structure $HS—(R—S—S)_n—R—SH$, wherein n is an integer from 7 to 38, and the tri-functional unit having the structure $HS—(R—S—S)_a—CH_2—CH((S—S—R)_c—SH)—CH_2—(S—S—R)_b—SH$, wherein a+b+c=n and n is an integer from 7 to 38.

The polythiol molecule or compound may comprise a mercaptan terminated polyether. Commercially available mercaptan terminated polyether include POLYTHIOL QE-340M available from Toray Fine Chemicals Co., Ltd.

Alternatively, to prepare the isocyanate-functional prepolymer, the isocyanate may be reacted with a mixture of one or more polyol, polyamine and/or polythiol. For example, an isocyanate-functional prepolymer may be prepared with a polyether having primary and/or secondary amino groups such as those described above and a polyether having hydroxyl groups (polyether polyol) such as described above.

To form the isocyanate-functional prepolymer the isocyanate and the species or molecule(s) containing the reactive hydrogen (e.g., the polyol, polyamine, polythiol or mixture of two or more of polyol, polyamine and polythiol) may be combined, optionally in the presence of a catalyst. An example of a suitable catalyst includes but is not limited to dibutylin dilaurate. The isocyanate-functional prepolymer has an isocyanate equivalent weight of 50 or greater, such as 50 to 10,000, such as 200 to 2000, such as 500 to 1000.

The isocyanate-functional prepolymer may be present in the composition in an amount of at least 9.5 percent by weight based on the total weight of the curable composition, such as 20 percent by weight based on the total weight of the curable composition, such as 25 percent by weight based on the total weight of the curable composition, such as 30 percent by weight based on the total weight of the curable composition, such as at least 50 percent by weight, such as at least 60 percent by weight, such as at least 70 percent by weight, such as at least 80 percent by weight, and in some cases may be present in the curable composition in an amount of no more than 89.5 percent by weight based on the total weight of the curable composition, such as no more than 86 percent by weight.

As noted, the curable compositions of the present invention also include an epoxy-containing component. Suitable epoxy compounds that may be used include monoepoxides, polyepoxides, or combinations thereof.

Suitable monoepoxides that may be used include glycidol, monoglycidyl ethers of alcohols and phenols, such as phenyl glycidyl ether, n-butyl glycidyl ether, cresyl glycidyl ether, isopropyl glycidyl ether, glycidyl versatate, for example, CARDURA E available from Shell Chemical Co., and glycidyl esters of monocarboxylic acids such as glycidyl neodecanoate, and mixtures of any of the foregoing.

Useful epoxy-containing components that can be used include polyepoxides (having an epoxy functionality greater than 1), epoxy adducts, or combinations thereof. Suitable polyepoxides include polyglycidyl ethers of Bisphenol A, such as Epon® 828 and 1001 epoxy resins, and Bisphenol F polyepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting epoxy components include epoxidized Bisphenol A novolacs, epoxidized phenolic novolacs, epoxidized cresylic novolac, isosorbide diglycidyl ether, triglycidyl p-aminophenol, and triglycidyl p-aminophenol, triglycidyl isocyanurate, tetraglycidyl 4,4'-diaminodiphenylmethane, and tetraglycidyl 4,4'-diaminodiphenylsulphone. The epoxy-containing component may also comprise a carboxyl-terminated butadiene-acrylonitrile copolymer modified epoxy-containing compound. The epoxy-containing compound may also comprise an epoxidized oil such as an epoxidized natural oil such as epoxidized castor oil. The epoxy-containing compound may also comprise an epoxy-containing acrylic, such as glycidyl methacrylate.

The epoxy-containing component may comprise an epoxy-adduct. The composition may comprise one or more epoxy-adducts. As used herein, the term "epoxy-adduct" refers to a reaction product comprising the residue of an epoxy and at least one other compound that does not include an epoxide functional group. For example, the epoxy-adduct may comprise the reaction product of reactants comprising an epoxy, a polyol, and an anhydride.

The epoxy used to form the epoxy-adduct may comprise any of the epoxy-containing compounds listed above that may be included in the composition.

The polyol used to form the epoxy-adduct may include diols, triols, tetraols and higher functional polyols. Combinations of such polyols may also be used. The polyols may be based on a polyether chain derived from ethylene glycol, propylene glycol, butylene glycol, hexylene glycol and the like as well as mixtures thereof. The polyol may also be based on a polyester chain derived from ring opening polymerization of caprolactone (referred to as polycaprolactone-based polyols hereinafter). Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof. Polyamines corresponding to polyols may also be used, and in this case, amides instead of carboxylic esters will be formed with the anhydrides.

The polyol may comprise a polycaprolactone-based polyol. The polycaprolactone-based polyols may comprise diols, triols or tetraols terminated with primary hydroxyl groups. Commercially available polycaprolactone-based polyols include those sold under the trade name Capa™ from Perstorp Group, such as, for example, Capa 2054, Capa 2077A, Capa 2085, Capa 2205, Capa 3031, Capa 3050, Capa 3091 and Capa 4101.

The polyol may comprise a polytetrahydrofuran-based polyol. The polytetrahydrofuran-based polyols may comprise diols, triols or tetraols terminated with primary hydroxyl groups. Commercially available polytetrahydrofuran-based polyols include those sold under the trade name Terathane®, such as Terathane® PTMEG 250 and Terathane® PTMEG 650 which are blends of linear diols in which the hydroxyl groups are separated by repeating tetramethylene ether groups, available from Invista. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

The anhydride that may be used to form the epoxy-adduct may comprise any suitable acid anhydride known in the art. For example, the anhydride may comprise hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianhydride (PMDA); 3,3',4,4'-oxydiphthalic dianhydride (ODPA); 3,3',4,4'-benzopherone tetracarboxylic dianhydride (BTDA); and 4,4'-diphthalic (hexafluoroisopropylidene) anhydride (6FDA).

The epoxy-adduct may comprise a diol, a monoanhydride, and a diepoxy compound, wherein the mole ratio of diol, monoanhydride, and diepoxy compounds in the epoxy-adduct may vary from 0.5:0.8:1.0 to 0.5:1.0:6.0.

The epoxy-adduct may comprise a triol, a monoanhydride, and a diepoxy compound, wherein the mole ratio of triol, monoanhydride, and diepoxy compounds in the epoxy-adduct may vary from 0.5:0.8:1.0 to 0.5:1.0:6.0.

The epoxy-adduct may comprise a tetraol, a monoanhydride, and a diepoxy compound, wherein the mole ratio of tetraol, monoanhydride, and diepoxy compounds in the epoxy-adduct may vary from 0.5:0.8:1.0 to 0.5:1.0:6.0.

Other suitable epoxy-containing components include epoxy-adducts such as epoxy polyesters formed as the reaction product of reactants comprising an epoxy-containing compound, a polyol and an anhydride, as described in U.S. Pat. No. 8,796,361, col. 3, line 42 through col. 4, line 65, the cited portion of which is incorporated herein by reference.

In another example, the epoxy-containing component of the curable composition may further include elastomeric particles. As used herein, "elastomeric particles" refers to particles comprised of one or more materials having at least one glass transition temperature (Tg) of greater than −150° C. and less than 30° C., calculated, for example, using the Fox Equation. The elastomeric particles may be phase-separated from the epoxy in the epoxy-containing component. As used herein, the term "phase-separated" means forming a discrete domain within a matrix of the epoxy-containing component.

The elastomeric particles may have a core/shell structure. Suitable core-shell elastomeric particles may be comprised of an acrylic shell and an elastomeric core. The core may comprise natural or synthetic rubbers, polybutadiene, styrene-butadiene, polyisoprene, chloroprene, acrylonitrile butadiene, butyl rubber, polysiloxane, polysulfide, ethylene-vinyl acetate, fluoroelastomer, polyolefin, hydrogenated styrene-butadiene, or combinations thereof.

The elastomeric particles may optionally be included in an epoxy carrier resin for introduction into the curable composition. Suitable finely dispersed core-shell elastomeric particles in an average particle size ranging from 20 nm to 400 nm may be master-batched in epoxy resin such as aromatic epoxides, phenolic novolac epoxy resin, bisphenol A and/or bisphenol F diepoxide, and/or aliphatic epoxides, which include cyclo-aliphatic epoxides, at concentrations ranging from 1% to 80% core-shell elastomeric particles by weight based on the total weight of the elastomeric dispersion, such as from 5% to 50%, such as from 10% to 35%. Suitable epoxy resins may also include a mixture of epoxy resins. When utilized, the epoxy carrier resin may be an epoxy-containing component such that the weight of the epoxy-containing component present in the curable composition includes the weight of the epoxy carrier resin.

Exemplary non-limiting commercial core-shell elastomeric particle products using poly(butadiene) rubber particles that may be utilized in the curable composition of the present invention include core-shell poly(butadiene) rubber powder (commercially available as PARALOID™ EXL 2650A from Dow Chemical), a core-shell poly(butadiene) rubber dispersion (25% core-shell rubber by weight) in bisphenol F diglycidyl ether (commercially available as Kane Ace MX 136), a core-shell poly(butadiene) rubber dispersion (33% core-shell rubber by weight) in Epon® 828 (commercially available as Kane Ace MX 153), a core-shell poly(butadiene) rubber dispersion (33% core-shell rubber by weight) in Epiclon® EXA-835LV (commercially available as Kane Ace MX 139), a core-shell poly(butadiene) rubber dispersion (37% core-shell rubber by weight) in bisphenol A diglycidyl ether (commercially available as Kane Ace MX 257), and a core-shell poly(butadiene) rubber dispersion (37% core-shell rubber by weight) in Epon® 863 (commercially available as Kane Ace MX 267), each available from Kaneka Texas Corporation, and acrylic rubber dispersions.

Exemplary non-limiting commercial core-shell elastomeric particle products using styrene-butadiene rubber particles that may be utilized in the curable composition include a core-shell styrene-butadiene rubber powder (commercially available as CLEARSTRENGTH® XT100 from Arkema), core-shell styrene-butadiene rubber powder (commercially available as PARALOID™ EXL 2650) from Dow Chemical), a core-shell styrene-butadiene rubber dispersion (33% core-shell rubber by weight) in bisphenol A diglycidyl ether (commercially available as Fortegra™ 352 from Olin™), core-shell styrene-butadiene rubber dispersion (33% rubber by weight) in low viscosity bisphenol A diglycidyl ether (commercially available as Kane Ace MX 113), a core-shell styrene-butadiene rubber dispersion (25% core-shell rubber by weight) in bisphenol A diglycidyl ether (commercially available as Kane Ace MX 125), a core-shell styrene-butadiene rubber dispersion (25% core-shell rubber by weight) in bisphenol F diglycidyl ether (commercially available as Kane Ace MX 135), a core-shell styrene-butadiene rubber dispersion (25% core-shell rubber by weight) in D.E.N.™-438 phenolic novolac epoxy (commercially available as Kane Ace MX 215), a core-shell styrene-butadiene rubber dispersion (25% core-shell rubber by weight) in Araldite® MY-721 multi-functional epoxy (commercially available as Kane Ace MX 416), a core-shell styrene-butadiene rubber dispersion (25% core-shell rubber by weight) in MY-0510 multi-functional epoxy (commercially available as Kane Ace MX 451), a core-shell styrene-butadiene rubber dispersion (25% core-shell rubber by weight) in Syna Epoxy 21 Cyclo-aliphatic Epoxy from Synasia (commercially available as Kane Ace MX 551).

Exemplary non-limiting commercial core-shell elastomeric particle products using polysiloxane rubber particles that may be utilized in the curable composition of the present invention include a core-shell polysiloxane rubber powder (commercially available as GENIOPERL® P52 from Wacker), a core-shell polysiloxane rubber dispersion (40% core-shell rubber by weight) in bisphenol A diglycidyl ether (commercially available as ALBIDUR® EP2240A from Evonik), a core-shell polysiloxane rubber dispersion (25% core-shell rubber by weight) in jER™828 (commercially available as Kane Ace MX 960), a core-shell polysiloxane rubber dispersion (25% core-shell rubber by weight) in Epon® 863 (commercially available as Kane Ace MX 965).

According to the present invention, the epoxy-containing component (including where an epoxy-containing component that may include one or more epoxies and/or elastomeric particles dispersed in an epoxy) may be present in the composition in an amount of at least 10 percent by weight based on the total weight of the curable composition, such as 20 percent by weight based on the total weight of the curable composition, such as 25 percent by weight based on the total weight of the curable composition, such as 30 percent by weight based on the total weight of the curable composition, such as at least 50 percent by weight, such as at least 60 percent by weight, such as at least 70 percent by weight, such as at least 80 percent by weight, and in some cases may be present in the curable composition in an amount of no more than 90 percent by weight based on the total weight of the curable composition, such as no more than 86 percent by weight. According to the present invention, the epoxy-containing component may be present in the curable composition in an amount of 25 percent by weight to 86 percent by weight based on total weight of the curable composition, such as 50 percent by weight to 75 percent by weight.

As noted above, particles (e.g., elastomeric particles) may be introduced in a curable composition according to the invention in combination with the epoxy-containing component (e.g., included in the epoxy-containing component). Alternatively, particles (e.g., elastomeric particles) may be introduced in a curable composition separately or may be included in the isocyanate-functional prepolymer. For example, a core-shell styrene-butadiene rubber dispersion (25% core-shell rubber by weight) in polypropylene glycol (MW 400) (commercially available as Kane Ace MX 715 from Kaneka Texas Corporation), may form part of the isocyanate-functional prepolymer with, for example, the polypropylene glycol reacting with a polyisocyanate. The previously described weight percent of an isocyanate-functional prepolymer present in a curable composition according to the invention (e.g., 9.5 percent to 89.5 percent by weight of a curable composition) includes an isocyanate-functional prepolymer that may contain particles.

A ratio of isocyanate-functional prepolymer to epoxy component in a curable composition can be selected to tune the mechanical properties of the curable composition. Increasing an amount of isocyanate-functional prepolymer, for example, will tend to provide the curable composition with a more urea-like character rendering the curable composition in at least partially cured state or fully cured state generally more flexible whereas increasing the epoxy component will tend to provide the curable composition with more of an epoxy-like character (generally increased strength and less flexibility).

As noted, the curable composition of the present invention further includes a latent curing agent. The latent curing agent may be an encapsulated curing agent, a non-encapsulated curing agent, a blocked curing agent, or combinations thereof. The latent curing agent may be activatable by an external energy source such as an elevated temperature (e.g., a temperature greater than ambient temperature). For example, the latent curing agent may be present in the curable composition in a solid state at ambient temperature or slightly thermal temperatures (e.g., greater than ambient temperature but less than 100° C.). In a solid state, the curing agent is non-reactive or substantially non-reactive with the isocyanate-functional prepolymer or the epoxy-containing component. Upon exposure to an elevated temperature as an external energy source (e.g., a temperature greater than 100° C.), the latent curing agent may melt or transition from a solid state to a liquid state or dissolve in the composition. As a melt or in a liquid or dissolved state, the latent curing agent may react with at least one or each of the isocyanate-functional prepolymer and the epoxy-containing component in the curable composition (e.g., react with at least one or each of the isocyanate-functional prepolymer or the epoxy-containing component).

A suitable latent curing agent may be a curing agent having two or more reactive N—H bonds. Preferable latent curing agents are latent at ambient temperature or slightly thermal temperature and may be activated to react (e.g., react) with at least one of the isocyanate-functional prepolymer and the epoxy-containing component when the composition is exposed to external energy source such as a high temperature (e.g., an activation temperature of 100° C. or greater or an activation temperature between 100° C. and 350° C.).

One example of a latent curing agent may comprise, or consist essentially of, or consist of, a guanidine. It will be understood that "guanidine," as used herein, refers to guanidine and derivatives thereof. For example, the latent curing agent that may be used includes guanidines, substituted guanidines, substituted ureas, melamine resins, guanamine derivatives, and/or mixtures thereof. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine. An example of a cyanoguanidine is DYHARD® 100SF commercially available from AlzChemGmbH. DYHARD® 100SF is a solid at ambient temperature and slightly thermal temperatures. On exposure to a temperature of 150° C. or greater (e.g., 210° C. or greater), DYHARD® 100SF will melt or dissolve into the composition). In a melted or solubilized state, DYHARD® 100SF has an ability (e.g., a property) to react with the isocyanate-functional prepolymer and the epoxy-containing component allowing the curable composition to cure rapidly (e.g., 10 to 15 minutes). Representatives of suitable guanamine derivatives which may be mentioned are alkylated benzoguanamine resins, benzoguanamine resins or methoxymethylethoxymethylbenzoguanamine.

For example, the guanidine may comprise a compound, moiety, and/or residue having the following general structure:

(I)

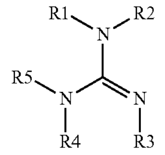

wherein each of R1, R2, R3, R4, and R5 (i.e., substituents of structure (I)) comprise hydrogen, (cyclo)alkyl, aryl, aromatic, organometallic, a polymeric structure, or together can form a cycloalkyl, aryl, or an aromatic structure, and wherein R1, R2, R3, R4, and R5 may be the same or different. As used herein, "(cyclo)alkyl" refers to both alkyl and cycloalkyl. When any of the R groups "together can form a (cyclo)alkyl, aryl, and/or aromatic group", it is meant that any two adjacent R groups are connected to form a cyclic moiety, such as the rings in structures (II)-(V) below.

It will be appreciated that the double bond between the carbon atom and the nitrogen atom that is depicted in structure (I) may be located between the carbon atom and another nitrogen atom of structure (I). Accordingly, the various substituents of structure (I) may be attached to different nitrogen atoms depending on where the double bond is located within the structure.

The guanidine may comprise a cyclic guanidine such as a guanidine of structure (I) wherein two or more R groups of structure (I) together form one or more rings. In other words, the cyclic guanidine may comprise ≥1 ring(s). For example, the cyclic guanidine may either be a monocyclic guanidine (1 ring) such as depicted in structures (II) and (III) below, or the cyclic guanidine may be bicyclic or polycyclic guanidine (≥2 rings) such as depicted in structures (IV) and (V) below.

(II)

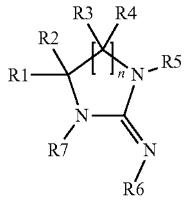

(III)

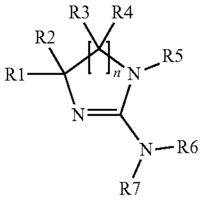

(IV)

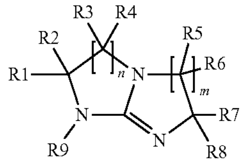

(V)

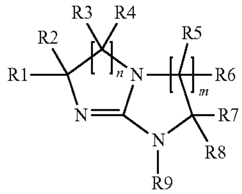

Each substituent of structures (II) and/or (III), R1-R7, may comprise hydrogen, (cyclo)alkyl, aryl, aromatic, organometallic, a polymeric structure, or together can form a cycloalkyl, aryl, or an aromatic structure, and wherein R1-R7 may be the same or different. Similarly, each substituent of structures (IV) and (V), R1-R9, may be hydrogen, alkyl, aryl, aromatic, organometallic, a polymeric structure, or together can form a cycloalkyl, aryl, or an aromatic structure, and wherein R1-R9 may be the same or different. Moreover, in some examples of structures (II) and/or (III), certain combinations of R1-R7 may be part of the same ring structure. For example, R1 and R7 of structure (II) may form part of a single ring structure. Moreover, it will be understood that any combination of substituents (R1-R7 of structures (II) and/or (III) as well as R1-R9 of structures (IV) and/or (V)) may be chosen so long as the substituents do not substantially interfere with the catalytic activity of the cyclic guanidine.

Each ring in the cyclic guanidine may be comprised of five or more members. For example, the cyclic guanidine may comprise a 5-member ring, a 6-member ring, and/or a 7-member ring. As used herein, the term "member" refers to an atom located in a ring structure. Accordingly, a 5-member ring will have 5 atoms in the ring structure ("n" and/or "m"=1 in structures (II)-(V)), a 6-member ring will have 6 atoms in the ring structure ("n" and/or "m"=2 in structures (II)-(V)), and a 7-member ring will have 7 atoms in the ring structure ("n" and/or "m"=3 in structures (II)-(V)). It will be appreciated that if the cyclic guanidine is comprised of ≥2 rings (e.g., structures (IV) and (V)), the number of members in each ring of the cyclic guanidine can either be the same or different. For example, one ring may be a 5-member ring while the other ring may be a 6-member ring. If the cyclic guanidine is comprised of ≥3 rings, then in addition to the combinations cited in the preceding sentence, the number of members in a first ring of the cyclic guanidine may be different from the number of members in any other ring of the cyclic guanidine.

It will also be understood that the nitrogen atoms of structures (II)-(V) may further have additional atoms attached thereto. Moreover, the cyclic guanidine may either be substituted or unsubstituted. For example, as used herein in conjunction with the cyclic guanidine, the term "substituted" refers to a cyclic guanidine wherein R5, R6, and/or R7 of structures (II) and/or (III) and/or R9 of structures (IV) and/or (V) is not hydrogen. As used herein in conjunction with the cyclic guanidine, the term "unsubstituted" refers to a cyclic guanidine wherein R1-R7 of structures (II) and/or (III) and/or R1-R9 of structures (IV) and/or (V) are hydrogen.

The cyclic guanidine may comprise a bicyclic guanidine, and the bicyclic guanidine may comprise 1,5,7-triazabicyclo [4.4.0]dec-5-ene ("TBD" or "BCG").

Further examples of latent curing agents include, but are not limited to, aromatic amines, such as bis(aminophenyl) sulfone, or dihydrazides such as adipic dihydrazide.

The latent curing agent may be present in the curable composition in an amount of at least 0.5:1 to 3:1 such as at least 0.75:1 to 2.5:1, based on the ratio of molar equivalents of amine hydrogens to the total molar equivalents of isocyanate functional groups plus epoxide functional groups.

The curable composition may also include an accelerator that increases the rate or decreases the activation energy of a chemical reaction between the latent curing agent and the isocyanate-functional prepolymer and/or the epoxy-containing component. Useful accelerators that may be included in the curable composition may comprise secondary amines, tertiary amines, cyclic tertiary amines, amidines, or combinations thereof. The cyclic tertiary amine may comprise 1,4-diazabicyclo[2.2.2]octane ("DABCO"), 1,8-diazabicylo [5.4.0]undec-7-ene ("DBU"), 1,5-diazabicyclo[4.3.0]non-5-ene ("DBN"), and combinations thereof. Additional examples of suitable accelerators include, pyridine, imidazole, dimethylaminopyridine, 1-methylimidazole, N,N'-carbonyldiimidazole, [2,2]bipyridine, 2,4,6-tris(dimethylamino methyl)phenol, 3,5-dimethylpyrazole, and combinations thereof. Additional examples of useful accelerators include Mannich bases, tetraalkyl ammonium salts, and strong bases. The accelerator may be encapsulated by a polymer shell that melts at elevated temperatures; examples of such encapsulated accelerators include AER Hardener D1207 and AER Hardener D1301 available from Asahi Kasei Corporation.

Other useful accelerators include amidoamine or polyamide catalysts, such as, for example, one of the Ancamide® products available from Air Products, amine, amino-containing phenols, dihydrazide, imidazole, or dicyandiamide adducts and complexes, such as, for example, one of the Ajicure® products available from Ajinomoto Fine Techno Company, 3,4-dichlorophenyl-N,N-dimethylurea (A.K.A. Diuron) available from Alz Chem, or combinations thereof.

The accelerator, if present at all, may be present in the composition in an amount of at least 0.5 percent by weight based on total weight of the composition, such as at least 1 percent by weight, and may be present in an amount of no more than 25 percent by weight based on total weight of the composition, such as no more than 20 percent by weight. The accelerator, if present at all, may be present in the second component of the composition in an amount of 0.5 percent by weight to 25 percent by weight based on total weight of the composition, such as 1 percent by weight to 20 percent by weight.

A filler material or more than one filler material may optionally be included in the curable composition. Useful fillers that may be introduced to the curable composition to provide improved mechanical properties include, but are not limited to, fiberglass, fibrous titanium dioxide, whisker type calcium carbonate (aragonite), and carbon fiber (which includes graphite and carbon nanotubes). In addition, fiberglass ground to 5 microns or wider and to 50 microns or longer may provide additional tensile strength. Additionally, filler material may optionally be graphene and graphenic carbon particles (for example, xGnP graphene nanoplatelets commercially available from XG Sciences, and/or for example, carbon particles having structures comprising one or more layers of one-atom-thick planar sheets of sp2-bonded carbon atoms that are densely packed in a honeycomb crystal lattice). The graphenic carbon particles may be substantially flat; however, at least a portion of the planar sheets may be substantially curved, curled, creased, or buckled. The particles typically do not have a spheroidal or equiaxed morphology. Suitable graphenic carbon particles are described in U.S. Publication No. 2012/0129980, at paragraphs [0059]-[0065], the cited portion of which is incorporated herein by reference. Other suitable graphenic carbon particles are described in U.S. Pat. No. 9,562,175, at 6:6 to 9:52, the cited portion of which are incorporated herein by reference.

Organic and/or inorganic fillers, such as those that are substantially spherical, may optionally be included in the curable composition. Useful organic fillers that may be introduced include cellulose, starch, and acrylic. Useful inorganic fillers that may be introduced include borosilicate, aluminosilicate, calcium inosilicate (Wollastonite), mica, silica and calcium carbonate. The organic and inorganic fillers may be solid, hollow, or layered in composition and may range in size from 10 nm to 1 mm in at least one dimension.

Optionally, additional fillers, thixotropes, colorants, tints and/or other materials also may be added to the adhesive composition.

Useful thixotropes that may be used include untreated fumed silica and treated fumed silica, castor wax, clay, organo clay and combinations thereof. In addition, fibers such as synthetic fibers like Aramid® fiber and Kevlar® fiber, acrylic fibers, and/or engineered cellulose fiber may also be utilized.

Useful colorants, dyes, or tints may include red iron pigment, titanium dioxide, calcium carbonate, and phthalocyanine blue and combinations thereof.

Useful fillers that may be used in conjunction with thixotropes may include inorganic fillers such as inorganic clay or silica and combinations thereof.

Exemplary other materials that may be utilized include, for example, calcium oxide and carbon black and combinations thereof.

Such fillers, if present at all, may be present in the curable composition in an amount of no more than 25 percent by weight based on total weight of the curable composition, such as no more than 15 percent by weight, such as no more than 10 percent by weight, such as no more than 5 percent by weight. Such fillers may be present in the curable composition an amount of 0 percent to 25 percent by weight based on total weight of the curable composition, such as 0.1 percent by weight to 15 percent by weight, such as 0.5 percent by weight to 10 percent by weight, such as 1 percent by weight to 5 percent by weight.

Optionally, the curable composition may be substantially free, or essentially free, or completely free, of platy fillers such as talc, pyrophyllite, chlorite, vermiculite, or combinations thereof.

The curable composition may further comprise an additive or more than one additive. As used herein, the term "additives" refers to ingredients or components included in the coating composition in addition to the isocyanate-functional prepolymer, the epoxy-containing compound, the latent curing agent, the accelerator (if any), and the fillers (if any) described herein. Exemplary non-limiting examples of such additives include adhesion promoters, silane coupling agents such as Silquest A-187 from Momentive, flame retardants, colloidal silica such as NANOPDX® dispersions from Evonik, thermoplastic resins, acrylic polymer beads such as ZEFIAC® beads from AICA Kogyo Co, cyclic carbonate-functional molecules, or combinations thereof.

Such additives, if present at all, may be present in the curable composition in an amount of at least 0.1 percent by weight based on total weight of the curable composition, such as at least 0.2 percent by weight, and may be present in the curable composition in an amount of no more than 20 percent by weight based on total weight of the curable composition, such as no more than 10 percent by weight.

The present invention is also directed to a method for treating a substrate comprising, or consisting essentially of, or consisting of, contacting at least a portion of a substrate with a curable composition such as a described above as a 1K curable composition and exposing the curable composition to an elevated temperature to activate the latent curing agent to, for example, react with at least one of the isocyanate-functional prepolymer and the epoxy-containing component. As a 1K composition, the curable composition may be storage stable at ambient temperature or slightly thermal temperature for at least one month under a nitrogen blanket and be in a dispensable form (e.g., have viscosity of a pourable or spreadable solution). A portion of the substrate may be contacted by the curable composition by applying the curable composition to a surface of the substrate in any number of different ways, non-limiting examples of which include brushes, rollers, films, pellets, spray guns, applicator guns, and injectors. Optionally, the curable composition, once applied to a surface of the substrate, may be contacted with at least a portion of surface of a second substrate such that the curable composition is located between the first substrate and the second substrate. Optionally, the curable composition may be injected into, on or around composite sheets, meshes, and the like that themselves may serve as the substrate that is contacted according to the method (e.g., in a method to form a stand-alone composite of a sheet(s) (e.g., a fibrous material sheet) or mesh(es) and the curable composition) or the sheet(s), mesh(es) or the like with the curable composition may form a composite coating, sealant or adhesive on a substrate.

Following contacting of a substrate (e.g., a substrate surface) with the curable composition, the curable composition may be at least partially cured by exposing the curable composition to an external energy source. For example, the curable composition may be cured by baking and/or curing at an elevated temperature, such as at a temperature of at least 100° C., such as at least 110° C., such as at least 125° C., such as at least 150° C., and in some cases at a temperature of no more than 250° C., such as no more than 200° C., such as no more than 190° C., and for any desired time period (e.g., from five minutes to one hour) sufficient to at least partially cure the adhesive composition on the substrate(s). The selected elevated temperature may be selected to be a temperature that will melt the latent curing agent (e.g., a melting point of the latent curing agent) or cause it to dissolve in the composition. The latent curing agent may be present in the 1K curable composition in a solid state when a substrate is contacted at ambient temperature or slightly thermal temperature with the curable composition and then exposed to an external energy source, such as an elevated temperature, sufficient to transform the latent curing agent from a solid state to a liquid state or dissolve in the composition and react to at least partially cure the curable composition.

In an example where the curable composition is an adhesive composition, the curable composition may be applied to a surface of either one or both of two substrates being bonded to form an adhesive bond there between and the substrates may be aligned and pressure and/or spacers may be added to control bond thickness. The adhered substrates may define an article that may be a vehicular component (e.g., automotive or aerospace component) or industrial component (e.g., two bonded metal or plastic substrates used in a mechanical engineering application for industry).

The curable composition may be applied to cleaned or uncleaned (i.e., including oily or oiled) substrate surfaces. The curable composition may be cured to form a coating, layer or film on the substrate surface as described herein. The coating, layer or film, may be, for example, a sealant or an adhesive.

For example, the present invention may be a method for forming a bond between two substrates for a wide variety of potential applications in which the bond between the substrates provides particular mechanical properties related to both lap shear strength and displacement.

As stated above, the curable composition of the present disclosure may form a coating, a seal, or an adhesive on a substrate or a substrate surface. The curable composition may be applied to substrate surfaces, including, by way of non-limiting example, a vehicle body, components of an automobile frame (automotive component) or an airplane (aerospace component), parts used in or on a vehicle, to armor assemblies such as those on a tank, or to protective clothing such as body armor, personal armor, suits of armor, and the like (an article of protective clothing). The sealant formed by the curable composition of the present invention provides sufficient lap shear strength and displacement. The curable composition may be applied alone or as part of a system. The curable composition may also be applied to a substrate that has been deoxidized, pretreated, coated with an electrodepositable coating, and/or coated with additional layers such as a primer, basecoat, or topcoat.

The present invention also is directed to a substrate comprising a coating on a surface, wherein the coating is formed from one of the curable compositions described. The present invention also is directed to a part at least partially coated with a coating, film, or the like formed from one of the curable compositions. The present invention is also directed to an article comprising first and second substrates and a coating formed from one of the curable compositions positioned between the first and second substrates. The present invention is also directed to a composite comprising one of the curable compositions injected into, on, and/or around a fibrous sheet or mesh. The composite may be a stand-alone component of, for example, a vehicular component (e.g., an automotive part, an aerospace part) or industrial component. The fibrous sheet or mesh may be woven or non-woven.

It has been surprisingly discovered that the curable composition of the present invention, in an at least partially cured state, may have a tensile strength of at least 20 megapascals (MPa) and a tensile strain at break of greater than 20 percent measured using the tensile specimen dimensions presented in FIG. 1, measured using an INSTRON 5567 machine in tensile mode with a pull rate of five millimeters (mm) per minute. A ratio of isocyanate-functional prepolymer to epoxy component in a curable composition can be selected to tune the mechanical properties of the curable composition in an at least partially cured state for a particular application. For example, the curable composition of the present invention, in an at least partially cured state, may be selected to have a tensile stress between 20 MPa and 50 MPa that will provide a corresponding strain or elongation percentage of about 200 percent to 30 percent. In general, increasing an amount or weight percentage of the epoxy-containing component in the curable composition provides higher lap shear and tensile stress as well as increased glass transition temperatures (Tg). Increasing an amount of the isocyanate-functional prepolymer in the curable composition, will tend to provide the curable composition with a more urea-like character that is more flexible as evidenced by higher tensile strain or elongation percentage.

The substrates that may be coated by the curable compositions of the present invention are not limited. Suitable substrates useful in the present invention include, but are not limited to, materials such as metals or metal alloys, ceramic materials such as boron carbide or silicon carbide, polymeric materials such as hard plastics including filled and unfilled thermoplastic materials or thermoset materials, woven or non-woven fibrous sheets or meshes, or composite materials. Other suitable substrates useful in the present invention include, but are not limited to, glass or natural materials such as wood. For example, suitable substrates include rigid metal substrates such as ferrous metals, aluminum, aluminum alloys, magnesium titanium, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Aluminum alloys of the 1XXX, 2XXX, 3XXX, 4XXX, 5XXX, 6XXX, 7XXX, or 8XXX series as well as clad aluminum alloys and cast aluminum alloys of the A356, 1XX.X, 2XX.X, 3XX.X, 4XX.X, 5XX.X, 6XX.X, 7XX.X, or 8XX.X series also may be used as the substrate. Magnesium alloys of the AZ31B, AZ91C, AM60B, or EV31A series also may be used as the substrate. The substrate used in the present invention may also comprise titanium and/or titanium alloys of grades 1-36 including H grade variants. Other suitable non-ferrous metals include copper and magnesium, as well as alloys of these materials. Suitable metal substrates for use in the present invention include those that are used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, and industrial structures and components. As used herein, "vehicle" or variations thereof includes, but is not limited to, civilian, commercial and military aircraft (aerospace components), and/or land vehicles such as cars, motorcycles, and/or trucks (collectively automotive components). The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091. The substrate may comprise a composite material such as a plastic or a fiberglass composite. The substrate may be a fiberglass and/or carbon fiber composite. The compositions of the present invention are particularly suitable for use in various industrial or transportation applications including automotive, light and heavy commercial vehicles, marine, or aerospace.

ASPECTS

Aspect 1. A curable composition comprising: an isocyanate-functional prepolymer; an epoxy-containing component present in an amount of at least 10 percent by weight of the composition; and a latent curing agent having an ability to react with at least one of the isocyanate-functional prepolymer and the epoxy-containing component upon exposure to external energy source.

Aspect 2. The curable composition of Aspect 1, wherein the epoxy-containing component is present in an amount of 15 percent to 90 percent by weight of the curable composition.

Aspect 3. The curable composition of Aspect 1 or Aspect 2, wherein the curable composition comprises elastomeric particles.

Aspect 4. The curable composition of Aspect 3, wherein the elastomeric particles have a core-shell structure.

Aspect 5. The curable composition of any of Aspects 1-4, wherein the latent curing agent comprises a guanidine functional group.

Aspect 6. The curable composition of any of Aspects 1-5, wherein the curable composition further comprises an encapsulated accelerator.

Aspect 7. The curable composition of any of Aspects 1-6, wherein the isocyanate-functional prepolymer comprises a reaction product of a polyisocyanate and a species having an average of more than one reactive hydrogen including a polyol, polyamine, polythiol or mixtures thereof.

Aspect 8. The curable composition of Aspect 7, wherein the species having the reactive hydrogen comprises a polyether having reactive hydroxyl groups.

Aspect 9. The curable composition of any of Aspects 1-8, wherein the curable composition, in an at least partially cured state, has a tensile strength greater than 20 MPa and an elongation at break greater than 20 percent.

Aspect 10. A substrate comprising a surface at least partially coated with a layer formed from the curable composition of any of Aspects 1-9.

Aspect 11. The substrate of Aspect 10, wherein the substrate is an automotive component.

Aspect 12. The substrate of Aspect 10, wherein the substrate is an aerospace component.

Aspect 13. A substrate at least partially embedded in the curable composition of any of Aspects 1-9.

Aspect 14. The substrate of Aspect 13, wherein the substrate comprises a fibrous material, a sheet or a mesh.

Aspect 15. The substrate of Aspect 14, wherein the fibrous material, the sheet or the mesh comprises at least one of carbon fibers, glass fibers, and nylon.

Aspect 16. An article of protective clothing comprising the curable composition of any of Aspects 1-9.

Aspect 17. An article comprising a first substrate, a second substrate and the curable composition of any of Aspects 1-9 positioned between the first substrate and the second substrate in an at least partially cured state as an adhesive to adhere the first substrate to the second substrate.

Aspect 18. The article of Aspect 17, wherein each of the first substrate and the second substrate are automotive components.

Aspect 19. The article of Aspect 17, wherein each of the first substrate and the second substrate are aerospace components.

Aspect 20. A method of treating a substrate comprising: contacting at least a portion of a substrate with the curable composition of any of Aspects 1-9; and exposing the curable composition to an external energy source.

Aspect 21. The method of Aspect 20, wherein the substrate is a first substrate and the method further comprises contacting the curable composition with a second substrate such that the curable composition is between the first substrate and the second substrate.

Aspect 22. The method of Aspect 21, wherein each of the first substrate and the second substrate are automotive components.

Aspect 23. The method of Aspect 21, wherein each of the first substrate and the second substrate are aerospace components.

Aspect 24. The method of Aspect 20, wherein the substrate comprises a fibrous material, a sheet or a mesh.

Aspect 25. A curable composition comprising: an isocyanate-functional prepolymer; an epoxy-containing component present in an amount of at least 10 percent by weight of the composition; and a curing agent, wherein the curable composition has a first uncured state when the curing agent is a solid and will transition from the first uncured state to a second at least partially cured state when the curing agent changes phase from a solid to a liquid or dissolves into the curable composition.

Aspect 26. The curable composition of Aspect 25, wherein the epoxy-containing component is present in an amount of 15 percent to 90 percent by weight of the curable composition.

Aspect 27. The curable composition of Aspect 25 or Aspect 26, wherein the curable composition comprises elastomeric particles.

Aspect 28. The curable composition of Aspect 27, wherein the elastomeric particles have a core-shell structure.

Aspect 29. The curable composition of any of Aspects 25-28, wherein the curing agent comprises a guanidine functional group.

Aspect 30. The curable composition of any of Aspects 25-29, wherein the curable composition further comprises an encapsulated accelerator.

Aspect 31. The curable composition of any of Aspects 25-30, wherein the isocyanate-functional prepolymer comprises a reaction product of a polyisocyanate and a polyether having hydroxyl groups.

Aspect 32. The curable composition of any of Aspects 25-31, wherein the curable composition, in an at least partially cured state, has a tensile strength greater than 20 MPa and an elongation at break greater than 20 percent.

Aspect 33. A substrate comprising at least one surface at least partially coated with a layer formed from the curable composition of any of Aspects 25-32.

Aspect 34. The substrate of Aspect 33, wherein the substrate is an automotive component.

Aspect 35. The substrate of Aspect 33, wherein the substrate is an aerospace component.

Aspect 36. A substrate at least partially embedded in the curable composition of any of Aspects 25-32.

Aspect 37. The substrate of Aspect 36, wherein the substrate comprises a fibrous material, a sheet or a mesh.

Aspect 38. The substrate of Aspect 37, wherein the fibrous material, the sheet or the mesh comprises at least one of carbon fibers, glass fibers, and nylon.

Aspect 39. An article of protective clothing comprising the curable composition of any of Aspects 25-32.

Aspect 40. An article comprising a first substrate, a second substrate and the curable composition of any of Aspects 25-32 positioned between the first substrate and the second substrate in an at least partially cured state as an adhesive to adhere the first substrate to the second substrate.

Aspect 41. The article of Aspect 40, wherein each of the first substrate and the second substrate are automotive components.

Aspect 42. The article of Aspect 40, wherein each of the first substrate and the second substrate are aerospace components.

Aspect 43. A method comprising: contacting at least a portion of a substrate with the curable composition of any of Aspects 25-32; and effecting a change of the curing agent from a solid to a liquid or dissolved phase.

Aspect 44. The method of Aspect 43, wherein effecting a change of the curing agent from a solid to a liquid phase comprises exposing the coating composition to an elevated temperature.

Aspect 45. The method of Aspect 43 or Aspect 44, wherein the substrate is a first substrate and the method further comprises contacting the curable composition with a second substrate such that the curable composition is between the first substrate and the second substrate.

Aspect 46. The method of Aspect 45, wherein each of the first substrate and the second substrate are vehicular components.

Aspect 47. The method of Aspect 43 or Aspect 44, wherein the substrate comprises a fibrous material, a sheet or a mesh.

EXAMPLES

Example 1

All quantities in the following tables, unless otherwise noted, are measured in grams. An isocyanate-functional polyurethane prepolymer was prepared using the components in Table 1 below in the amounts indicated. The isophorone diisocyanate ("IPDI") was first added to an appropriately sized flask blanketed with nitrogen to avoid interaction with moisture. Dibutyltin dilaurate was added as a catalyst and this mixture was heated to 55° C. Polytetramethylene ether glycol was added at a rate such that the temperature did not exceed 70° C. After all of the polyol had been added, the reaction was slowly heated to 90° C. and held for one hour. The reaction product was then poured into a can and blanketed with nitrogen to avoid interaction with moisture.

TABLE 1

| Composition I | |
|---|---|
| Component | I (g) |
| Isophorone diisocyanate | 830 |
| Dibutyltin dilaurate | 0.13 |
| Terathane 650[1] | 1168 |

[1]Polytetramethylene ether glycol available from The LYCRA Company

Compositions II and III in Table 2 below were prepared by blending the components listed in their indicated amounts in a cup and mixing for 4 minutes at 2350 RPM using a Flacktek SpeedMixer®.

TABLE 2

| Compositions II-III | | |
|---|---|---|
| Component | II (g) | III (g) |
| Composition I | 200 | |
| Kane Ace MX-135[1] | | 200 |
| Dyhard 100SF[2] | 16 | 21 |
| Total | 221 | 216 |

[1]Blend of bisphenol F epoxy resin and ~100 nm diameter core-shell styrene-butadiene rubber particles available from Kaneka Corporation
[2]Dicyandiamide available from Alzchem Compositions II and III were then blended in a cup at the ratios described below in Table 3 and mixed for 4 minutes at 2350 RPM using a Flacktek SpeedMixer® to prepare Compositions IV-XIV. Compositions IV-XIV were drawn-down at a target thickness of 10 mils on a Teflon sheet spread over aluminum and baked at 175° C. for 20 minutes to prepare films. Tensile specimens were prepared using cured films of Compositions IV-XIV presented in Table 3 below. FIG. 1 shows the dimensions of the tensile specimens. Tensile specimens were prepared by using a die, tooled to the illustrated dimensions, and punching the die through the drawn-down and cured film using a Carver Laboratory Press. The specimens were tested using an INSTRON model 5567 in tensile mode with a pull rate of 5 mm per minute. The tensile stress was determined by dividing the maximum measured tensile load by the value obtained from multiplying the tensile specimen's width by its thickness. The percent elongation at break was determined by dividing the value of the Instron crosshead displacement at break by the length of the restricted area of the tensile specimen, i.e. 10 mm (see FIG. 1).

TABLE 3

| Compositions IV-XIV | | | | | | | | | | | |
|---|---|---|---|---|---|---|---|---|---|---|---|
| Component | IV | V | VI | VII | VIII | IX | X | XI | XII | XIII | XIV |
| Composition II | 24 | 21.6 | 19.2 | 16.8 | 14.4 | 12 | 9.6 | 7.2 | 4.8 | 2.4 | 0 |
| Composition III | 0 | 2.4 | 4.8 | 7.2 | 9.6 | 12 | 14.4 | 16.8 | 19.2 | 21.6 | 24 |
| AER D1301[1] | 1 | 1 | 1 | 1 | 1 | 1 | 1 | 1 | 1 | 1 | 1 |
| Total (g) | 25 | 25 | 25 | 25 | 25 | 25 | 25 | 25 | 25 | 25 | 25 |
| Tensile Strength (MPa) | 17.1 | 15.1 | 16.0 | 24.5 | 25.7 | 34.0 | 40.7 | 45.7 | 49.3 | 43.5 | 58.4 |
| Elongation at Break (%) | 748.7 | 462.6 | 304.0 | 220.7 | 111.5 | 72.5 | 60.6 | 19.6 | 14.6 | 23.9 | 13.0 |

[1]Encapsulated accelerator available from Asahi Kasei Corporation

Figure 2:
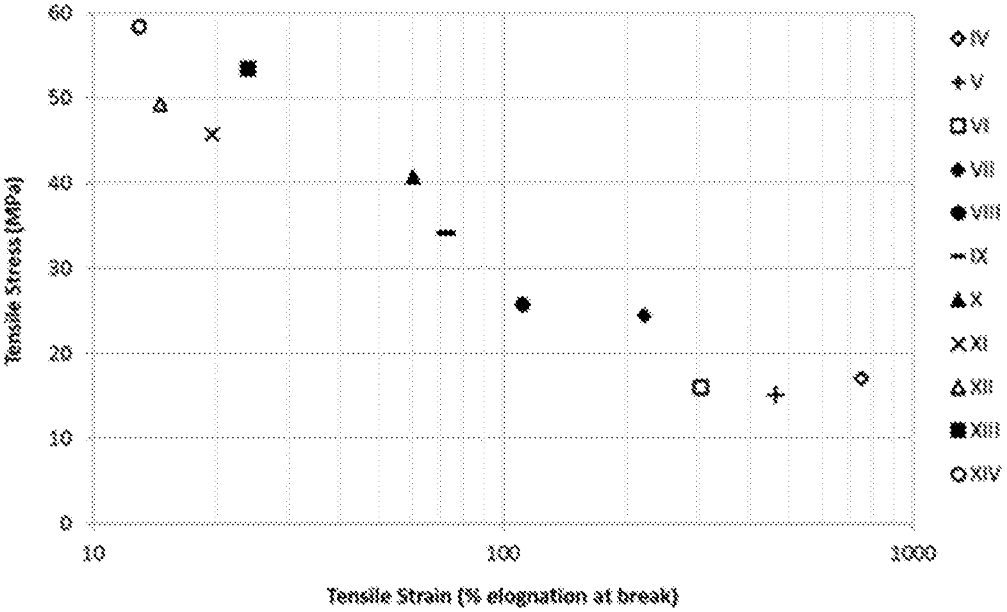
FIG. 2 shows a graphical representation of the tensile stress versus the strain for Compositions IV-XIV in Example 1.

FIG. 2 shows a graphical representation of the tensile stress versus the strain for Compositions IV-XIV and demonstrates that by adjusting a ratio of epoxy:isocyanate functional prepolymer, the final mechanical properties of a curable composition can be adjusted.

Example 2

An isocyanate-functional polyurethane prepolymer was prepared using the components in Table 4 below in the amounts indicated. The isophorone diisocyanate ("IPDI") was first added to an appropriately sized flask blanketed with nitrogen to avoid interaction with moisture. Dibutyltin dilaurate was added as a catalyst and this mixture was heated to 55° C. Polytetramethylene ether glycol was added at a rate such that the temperature did not exceed 70° C. After all of the polyol had been added, the reaction was slowly heated to 90° C. and held for an hour. The reaction product was then poured into a can and blanketed with nitrogen to avoid interaction with moisture.

TABLE 4

| Composition XV | |
|---|---|
| Component | XV |
| Isophorone diisocyanate | 1500 |
| Dibutyltin dilaurate | 0.24 |
| Polytetramethylene ether glycol | 2111.2 |

Compositions XVI, XVII, XVIII and XIX in Table 5 below were prepared by blending the components listed in their indicated amounts in a cup and mixing for 4 minutes at 2350 RPM using a Flacktek SpeedMixer®.

TABLE 5

| Compositions XVI-XIX | | | | |
|---|---|---|---|---|
| Component | XVI | XVII | XVIII | XIX |
| Kane Ace MX-136[1] | 110 | — | 110 | — |
| Composition XV | — | 75 | — | 75 |
| Dyhard 100SF | 14.46 | 6.02 | 14.46 | 6.02 |
| AER Hardener D1301 | 4.98 | 3.24 | — | — |
| AER Hardener D1207[2] | — | — | 4.98 | 3.24 |
| Total | 129.44 | 84.26 | 129.44 | 84.26 |

[1]Blend of bisphenol F epoxy resin and ~100 nm diameter core-shell polybutadiene rubber particles available from Kaneka Corporation
[2]Encapsulated accelerator available from Asahi Kasei Corporation Compositions XVI, XVII, XVIII and XIX were then blended in a cup at the ratios described below in Table 6 and mixed for 4 minutes at 2350 RPM using a SpeedMixer® to prepare compositions XX-XXIII Compositions XX-XXIII were drawn-down at a target thickness of 10 mils on a Teflon sheet spread over aluminum and baked at 150° C. for 20 minutes to prepare films. Tensile specimens were prepared using cured films of Compositions XX-XXIII, with the same dimensions as in the previous example. The specimens were tested using an INSTRON model 5567 in tensile mode with a pull rate of 5 mm per minute. The tensile stress and percent elongation at break were determined as in the previous example. Lap shear specimens were prepared on 1 inch by 4 inches by 0.040 inch thick 6022 Aluminum cleaned with acetone, with an overlap area of one inch by 0.5 inch. Solid glass spheres averaging 10 mils in diameter were sprinkled onto compositions prior to bonding with a second substrate in order to control the bondline thickness. Lap joint specimens were baked at 150° C. for 20 minutes. Lap joint specimens were loaded on an INSTRON model 5567 with a 4 inch gauge length and pulled at a rate of 13 mm per minute.

TABLE 6

| Compositions XX-XXIII | | | | |
|---|---|---|---|---|
| Component | XX | XXI | XXII | XXIII |
| Composition XVI | 7.5 | 8.75 | 10 | 11.25 |
| Composition XVII | 7.5 | 6.25 | 5 | 3.75 |
| Composition XVIII | 7.5 | 8.75 | 10 | 11.25 |
| Composition XIX | 7.5 | 6.25 | 5 | 3.75 |
| Total | 30 | 30 | 30 | 30 |
| Lapshear Strength (MPa) | 10.9 | 13.9 | 15.6 | 17.3 |
| Tensile Strength (MPa) | 22.35 | 31.56 | 33.66 | 40.3 |
| Elongation at Break (%) | 241.5 | 195.5 | 134.4 | 69.9 |

The results of Table 6 show that with increasing epoxy content, higher lap shear and tensile strength are achievable. Compositions XX-XXIII demonstrate uniquely high combinations of stress and strain at break, and also feature very precise tunability by manipulation of this system.

Example 3

Compositions XXIV, XXV, XXVI, XXVII and XXVIII in Table 7 below were prepared by blending the components listed in their indicated amounts in a cup and mixing for 4 minutes at 2350 RPM using a Flacktek SpeedMixer®.

TABLE 7

| Compositions XXIV-XXVIII | | | | | |
|---|---|---|---|---|---|
| Component | XXIV | XXV | XXVI | XXVII | XXVIII |
| Composition XV | 100 | | | | |
| Epon 863[1] | | 88.9 | | | |
| Epon 828[2] | | | 89.9 | | |
| Kane Ace MX-135 | | | | 91.3 | |
| Kane Ace MX-153[3] | | | | | 92.7 |
| Dyhard 100SF | 8.3 | 11.1 | 10.1 | 8.7 | 7.3 |
| Total | 108.3 | 100.0 | 100.0 | 100.0 | 100.0 |

[1]Bisphenol F epoxy resin available from Hexion
[2]Bisphenol A epoxy resin available from Hexion
[3]Blend of Bisphenol A epoxy resin and ~100 nm core-shell styrene-butadiene rubber particles available from Kaneka Corporation Compositions XXIV, XXV, XXVI, XXVII, XXVIII were then blended in a cup at the ratios described below in Table 8 and mixed for 4 minutes at 2350 RPM using a Speed-Mixer® to prepare compositions XXIX-XL. Compositions XXIX-XL were drawn-down at a targeted thickness of 10 mils on a Teflon sheet spread over aluminum and baked at 160° C. for 35 minutes to prepare films. Tensile specimens of Compositions XXX, XXXI, and XXXIV-XL were punched from the cured films using a die tooled to the dimensions illustrated in FIG. 1 and a Carver Laboratory Press. Tensile specimens of Compositions XXIX and XXXIII were prepared by cutting rectangular specimens from the cured film with a length of 30 mm and a width of 4 mm. Tensile specimens of Composition XXXII could not be cut or punched from cured films due to brittleness of the material. The specimens were tested using an INSTRON model 5567 in tensile mode with a pull rate of 5 mm per minute. The tensile stress was determined by dividing the maximum measured tensile load by the value obtained from multiplying the tensile specimen's width by its thickness. For tensile specimens punched from a cured film using the die, the percent elongation at break was determined by dividing the value of the Instron crosshead displacement at break by the length of the restricted area of the tensile specimen, i.e. 10 mm (see FIG. 1). For rectangular tensile specimens, the distance between Instron clamps at the beginning of the test was set to 10 mm; therefore, the percent elongation at break was determined by dividing the value of the Instron crosshead displacement at break by the gap length, i.e. 10 mm.

TABLE 8

| Compositions XXIX-XL | | | | | | | | | | | | |
|---|---|---|---|---|---|---|---|---|---|---|---|---|
| Component | XXIX | XXX | XXXI | XXXII | XXXIII | XXXIV | XXXV | XXXVI | XXXVII | XXXVIII | XXXIX | XL |
| Composition XXIV | 2.5 | 7.5 | 12.5 | 2.5 | 7.5 | 12.5 | 2.5 | 7.5 | 12.5 | 2.5 | 7.5 | 12.5 |
| Composition XXV | 22.5 | 17.5 | 12.5 | | | | | | | | | |
| Composition XXVI | | | | 22.5 | 17.5 | 12.5 | | | | | | |
| Composition XXVII | | | | | | | 22.5 | 17.5 | 12.5 | | | |
| Composition XXVIII | | | | | | | | | | 22.5 | 17.5 | 12.5 |
| Aerosil R202[1] | 0.5 | 0.5 | 0.5 | 0.5 | 0.5 | 0.5 | 0.5 | 0.5 | 0.5 | 0.5 | 0.5 | 0.5 |
| AER Hardener D1301 | 1.0 | 1.0 | 1.0 | 1.0 | 1.0 | 1.0 | 1.0 | 1.0 | 1.0 | 1.0 | 1.0 | 1.0 |
| Total | 26.5 | 26.5 | 26.5 | 26.5 | 26.5 | 26.5 | 26.5 | 26.5 | 26.5 | 26.5 | 26.5 | 26.5 |
| Tensile Strength (MPa) | 41.0 | 57.7 | 29.4 | — | 37.9 | 34.9 | 50.8 | 39.9 | 31.7 | 39.3 | 39.6 | 29.7 |
| Elongation at Break (%) | 6 | 9 | 42 | — | 7 | 41 | 23 | 45 | 132 | 21 | 73 | 136 |

[1]Hydrophobic fumed silica available from Evonik

The results of Table 8 show the tunable properties obtained by adjusting the ratio of isocyanate to epoxy component in the compositions. Furthermore, the results demonstrate the improvement of tensile strength and elongation at break with incorporation of core-shell rubber particles in compositions.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims and aspects appended and any and all equivalents thereof.

We claim:

1. A curable composition comprising:

an isocyanate-functional prepolymer comprising a reaction product of reactants comprising a polyol and an isocyanate having an isocyanate equivalent weight of 200 g/eq to 2,000 g/eq and present in an amount of 20 percent by weight to 86 percent by weight;

an epoxy-containing component comprising Bisphenol A, Bisphenol F, and/or an epoxy novolac, the epoxy-containing component present in an amount of 10 percent by weight to 75 percent by weight;

a latent curing agent comprising an amine hydrogen in an amount of at least 0.5:1 to 3:1 based on a ratio of molar equivalents of amine hydrogens to total molar equivalents of isocyanate functional groups plus epoxide functional groups and having an ability to react with at least one of the isocyanate-functional prepolymer and the epoxy-containing component upon exposure to an external energy source;

an elastomeric dispersion comprising elastomeric particles in an amount of 10% by weight to 35% by weight based on total weight of the elastomeric dispersion, wherein the elastomeric particles have a core-shell structure; and optionally an epoxy carrier resin incorporated into the elastomeric particles;

wherein the amount by weight is based on total weight of the composition.

2. The curable composition of claim 1, wherein the epoxy-containing component is present in an amount of 15 percent to 75 percent by weight of the curable composition.

3. The curable composition of claim 1, wherein the latent curing agent comprises a guanidine functional group.

4. The curable composition of claim 1, wherein the curable composition further comprises an encapsulated accelerator.

5. The curable composition of claim 1, wherein the polyol comprises a polyether polyol.

6. The curable composition of claim 1, wherein the curable composition, in an at least partially cured state, has a tensile strength greater than 20 MPa and an elongation at break greater than 20 percent.

7. The curable composition of claim 1, wherein the elastomeric particles have an average particle size of 20 nm to 400 nm.

8. A substrate comprising a surface at least partially coated with a layer formed from the curable composition of claim 1.

9. The substrate of claim 8, wherein the substrate is an automotive component.

10. The substrate of claim 8, wherein the substrate is an aerospace component.

11. A substrate at least partially embedded in the curable composition of claim 1.

12. The substrate of claim 11, wherein the substrate comprises a fibrous material, a sheet or a mesh.

13. The substrate of claim 12, wherein the fibrous material, the sheet or the mesh comprises at least one of carbon fibers, glass fibers, and nylon.

14. An article of protective clothing comprising the curable composition of claim 1.

15. An article comprising a first substrate, a second substrate and the curable composition of claim 1 positioned between the first substrate and the second substrate in an at least partially cured state as an adhesive to adhere the first substrate to the second substrate.

16. The article of claim 15, wherein each of the first substrate and the second substrate are automotive components.

17. The article of claim 15, wherein each of the first substrate and the second substrate are aerospace components.

18. A method of treating a substrate comprising:

contacting at least a portion of a substrate with the curable composition of claim 1; and exposing the curable composition to an external energy source.

* * * * *